(12) United States Patent
Conn et al.

(10) Patent No.: US 9,032,888 B2
(45) Date of Patent: May 19, 2015

(54) BUS SEAT BACK TRIM AND METHOD AND APPARATUS FOR MAKING

(75) Inventors: Earl DeWayne Conn, Washington, MI (US); Jeffrey Scott Graves, Goodrich, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 413 days.

(21) Appl. No.: 13/307,093

(22) Filed: Nov. 30, 2011

(65) Prior Publication Data

US 2013/0133562 A1 May 30, 2013

(51) Int. Cl.
*D05B 35/06* (2006.01)
*B60N 2/58* (2006.01)
*B60N 2/60* (2006.01)
*B60N 2/68* (2006.01)

(52) U.S. Cl.
CPC ............ *B60N 2/5816* (2013.01); *B60N 2/5825* (2013.01); *B60N 2/6009* (2013.01); *B60N 2/688* (2013.01)

(58) Field of Classification Search
CPC ..... D05B 35/062; D05B 35/064; D05B 35/06
USPC .................. 112/475.16, 152, 113, 470.21
See application file for complete search history.

(56) References Cited

U.S. PATENT DOCUMENTS

| | | | | |
|---|---|---|---|---|
| 2,977,904 | A * | 4/1961 | Hyman | 112/105 |
| 3,286,668 | A * | 11/1966 | Rockerath et al. | 112/104 |
| 3,346,298 | A * | 10/1967 | Champion | 297/452.16 |
| 3,780,682 | A * | 12/1973 | Frost | 112/475.07 |
| 4,032,191 | A | 6/1977 | Fetsch | |
| 4,059,306 | A | 11/1977 | Harder, Jr. | |
| 4,114,947 | A | 9/1978 | Nelson | |
| 4,116,148 | A * | 9/1978 | Torrez | 112/475.16 |
| 4,194,254 | A * | 3/1980 | Torrez | 5/420 |
| 4,265,190 | A * | 5/1981 | Moertel | 112/152 |
| 4,274,347 | A * | 6/1981 | Rohrer | 112/104 |
| 4,296,964 | A | 10/1981 | Haack | |
| 4,497,270 | A * | 2/1985 | Boser | 112/475.15 |
| 4,633,792 | A * | 1/1987 | Yoshioka | 112/104 |
| 4,674,422 | A * | 6/1987 | Boser | 112/470.33 |
| 4,704,781 | A * | 11/1987 | Frohlich | 29/408 |
| 4,714,038 | A * | 12/1987 | Boser | 112/475.17 |
| 4,844,539 | A | 7/1989 | Selbert | |
| 4,956,879 | A * | 9/1990 | Adams | 2/80 |
| 4,996,933 | A * | 3/1991 | Boser | 112/475.06 |
| 5,005,901 | A | 4/1991 | Hinde | |
| 5,070,799 | A * | 12/1991 | Montgomery et al. | 112/104 |
| 5,237,705 | A * | 8/1993 | Collins | 2/243.1 |
| 5,489,141 | A | 2/1996 | Strausbaugh et al. | |
| 5,560,683 | A | 10/1996 | Penley et al. | |
| 5,588,187 | A | 12/1996 | Swain | |
| 5,609,395 | A | 3/1997 | Burch | |
| 5,806,450 | A * | 9/1998 | Dudek et al. | 112/475.16 |
| 5,820,214 | A | 10/1998 | Bessette et al. | |
| 6,415,494 | B1 | 7/2002 | Burch | |

(Continued)

*Primary Examiner* — Danny Worrell
(74) *Attorney, Agent, or Firm* — Raggio & Dinnin, P.C.

(57) ABSTRACT

A bus seat for use in a bus comprises a frame and a seat back secured to a portion of the frame. The bus seat further comprises a seat cushion secured to another portion of the frame. The bus seat also comprises a removable two piece cover arranged over the seat back, wherein the cover pieces are secured to one another with a zipper. The zippered two piece seat back cover allows for easy installation, removal or replacement of any damaged or worn portions of the seat back trim cover.

13 Claims, 5 Drawing Sheets

(56) References Cited

U.S. PATENT DOCUMENTS

| | | |
|---|---|---|
| 6,554,356 B1 | 4/2003 | Crose |
| 6,644,750 B1 | 11/2003 | Sandman et al. |
| 7,488,036 B2 | 2/2009 | Tache |
| 7,770,248 B2 * | 8/2010 | Furlow .............................. 5/722 |
| 8,015,641 B2 * | 9/2011 | Furlow .............................. 5/653 |
| 2002/0020336 A1 * | 2/2002 | Yang ........................ 112/475.16 |

* cited by examiner

BUS SEAT BACK TRIM AND METHOD AND APPARATUS FOR MAKING

BACKGROUND OF THE INVENTION

1. Field of the Invention

The invention generally relates to bus seats, and more particularly relates to a zippered seam for use in a bus seat back trim cover that allows for easy removal and installation of the bus seat back cover.

2. Description of Related Art

Bus seats have been known for many years in the prior art. Many prior art bus seats have seat back trim that is affixed to a frame of the bus seat by a stapling operation to a plywood base of the seat back. Generally, this prior art methodology has been used for many years. The prior art bus seat back trim cover sometimes results in inconsistent manufacturing practices for installation and serviceability challenges, such as when the old bus seat back cover must be cut off and a new one stapled to the base. some of these prior art bus seat back covers also do not operate correctly when seat belt assemblies are added to the bus seat. Furthermore, many of these prior art bus seat back trim covers take as long as one hour to service when replacing a cut or harmed bus seat back cover that needs to be replaced. Generally, these bus seat back covers are made of a vinyl material. Furthermore, these prior art bus seats also have a bus seat cushion wherein the seat trim cover for the cushion portion of the seat is affixed to the cushion utilizing a staple gun that attaches the trim or cover to a plywood substrate. This prior art methodology has been used for many years wherein the trim cover, the foam and the plywood are compressed and then stapled into the form of a bus seat cushion. Many of these prior art bus seat cushions have manufacturing practices that do not clearly define the start and stop corner folds resulting in inconsistent final appearances for the bus seat cushions. Also, many of these prior art bus seat cushions are very challenging to service because the customer must cut off the old bus seat cushion cover trim and then re-staple a new bus seat cover over the cushion and underlying plywood of the bus seat cushion. Furthermore, the time needed to service or replace a bus seat cover cushion is very time intensive and labor intensive.

Therefore, there is a need in the art for an improved bus seat back trim cover. There also is a need in the art for a bus seat back trim cover that has a zipper arranged around an outer periphery thereof. There also is a need in the art for a bus seat back trim cover that is easy to replace and takes less time to replace than the prior art methodology. There also is a need in the art for a bus seat cushion trim cover to be more easily connected to the frame and sub frame of the bus seat cushion. There also is a need in the art for an apparatus for aligning and sewing a zipper on a front and rear portion or piece of a bus seat back trim cover. There also is a need in the art for an improved process of securing a zipper to a front and back portion of a bus seat back trim cover.

SUMMARY OF THE INVENTION

One object of the present invention may be to provide an improved bus seat.

Another object to the present invention may be to provide an improved bus seat back trim cover.

Still another object of the present invention may be to provide a bus seat back trim cover that has a front and back portion that are connected to one another via a zipper.

Still another object of the present invention may be to provide a bus seat cushion that uses a plurality of J-hooks to secure the trim cover for the bus seat cushion to the frame of the seat.

Still another object of the present invention may be to provide an improved process of connecting a zipper to a front and back portion of a bus seat back trim cover.

Still another object of the present invention may be to provide an apparatus for connecting a zipper to a front and back portion of a bus seat back trim cover.

Still another object of the present invention may be to provide for a method of removing and installing a bus seat back trim cover onto a bus seat with the use of a zipper.

To achieve the foregoing objects and other advantages, a bus seat for use a the bus is disclosed. The bus seat comprises a frame and a seat back secured to a portion of the frame. The bus seat also comprises a seat cushion secured to another portion of the frame and a removable two piece cover arranged over the seat back. The cover pieces are secured to one another with a zipper.

One advantage of the present invention may be that it provides a novel and improved bus seat.

Still another advantage of the present invention may be that it provides a novel and improved bus seat back trim cover.

Yet another advantage of the present invention may be that it provides a bus seat back trim cover that is made from two pieces that are connected to one another via a zipper.

Still another advantage of the present invention may be that it provides a bus seat cushion that connects its trim cover to the frame of the seat via J-hooks connected to an L-bracket.

Still another advantage of the present invention may be that it provides for a process of installing or removing a front or back portion of a bus seat back trim cover by unzipping a zipper or zipping a zipper.

Yet another advantage of the present invention may be that it provides for a process for securing a zipper to a front and back portion of a bus seat back trim cover.

Yet another advantage of the present invention may be that it provides for an apparatus used to secure a zipper to a front and back portion of a bus seat back trim cover.

Other objects, features and advantages of the present invention may become apparent from the subsequent description and the appended claims, taken in conjunction with the accompanying drawings.

DESCRIPTION OF THE EMBODIMENT(S)

Figure 1:
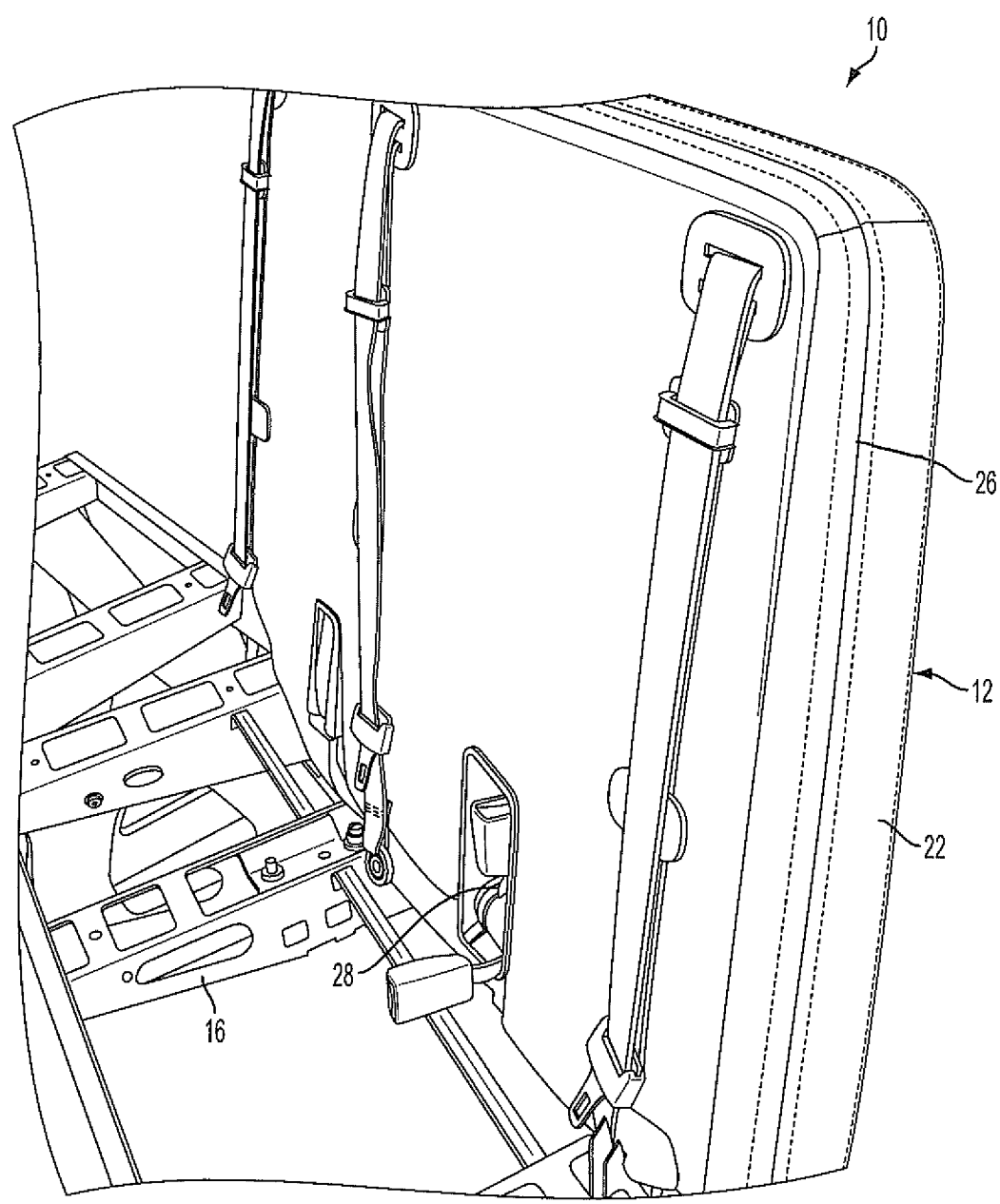
FIG. 1 is a perspective view of a bus seat back according to the present invention.
Figure 2:
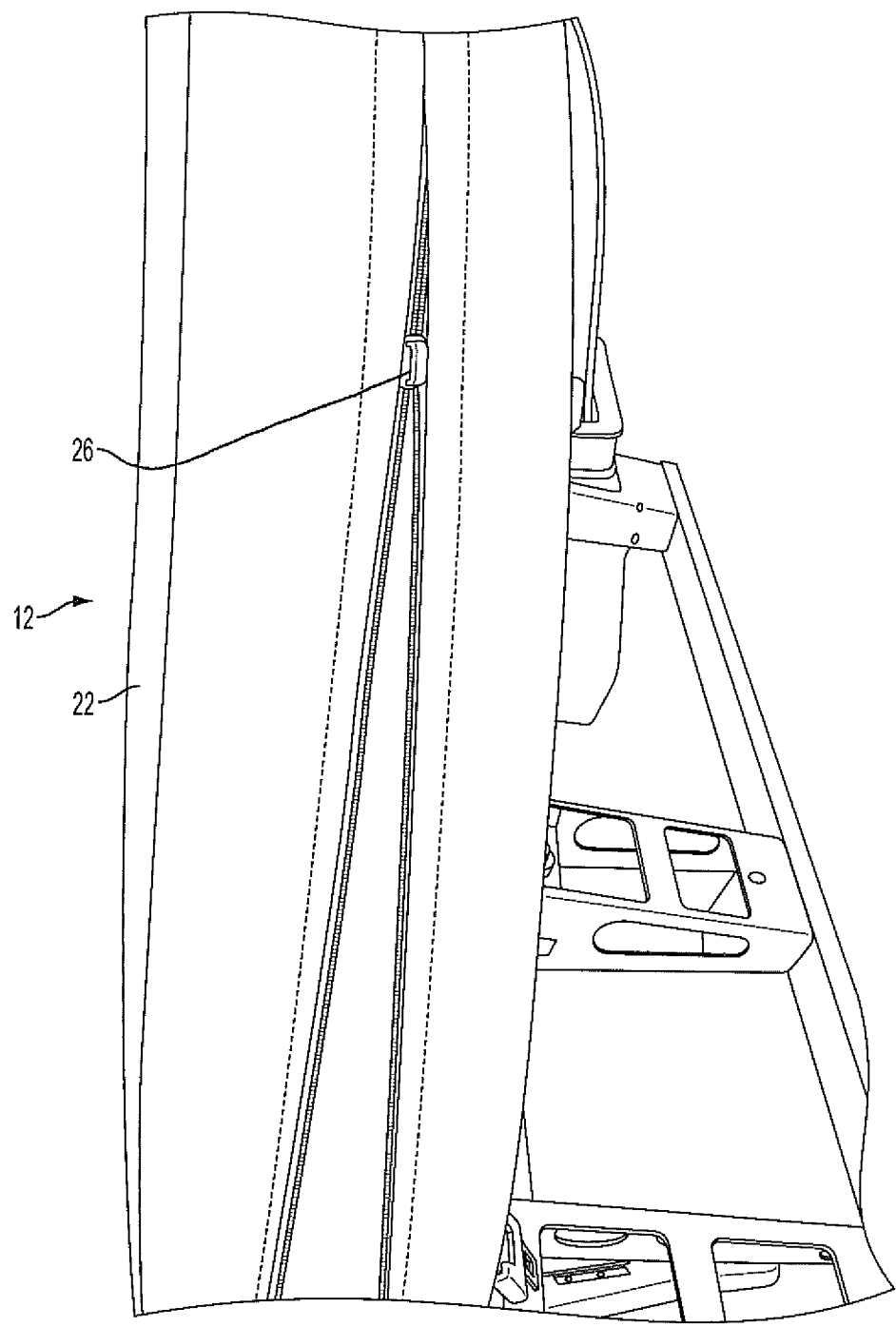
FIG. 2 is a side view of a bus seat back according to the present invention.
Figure 3:
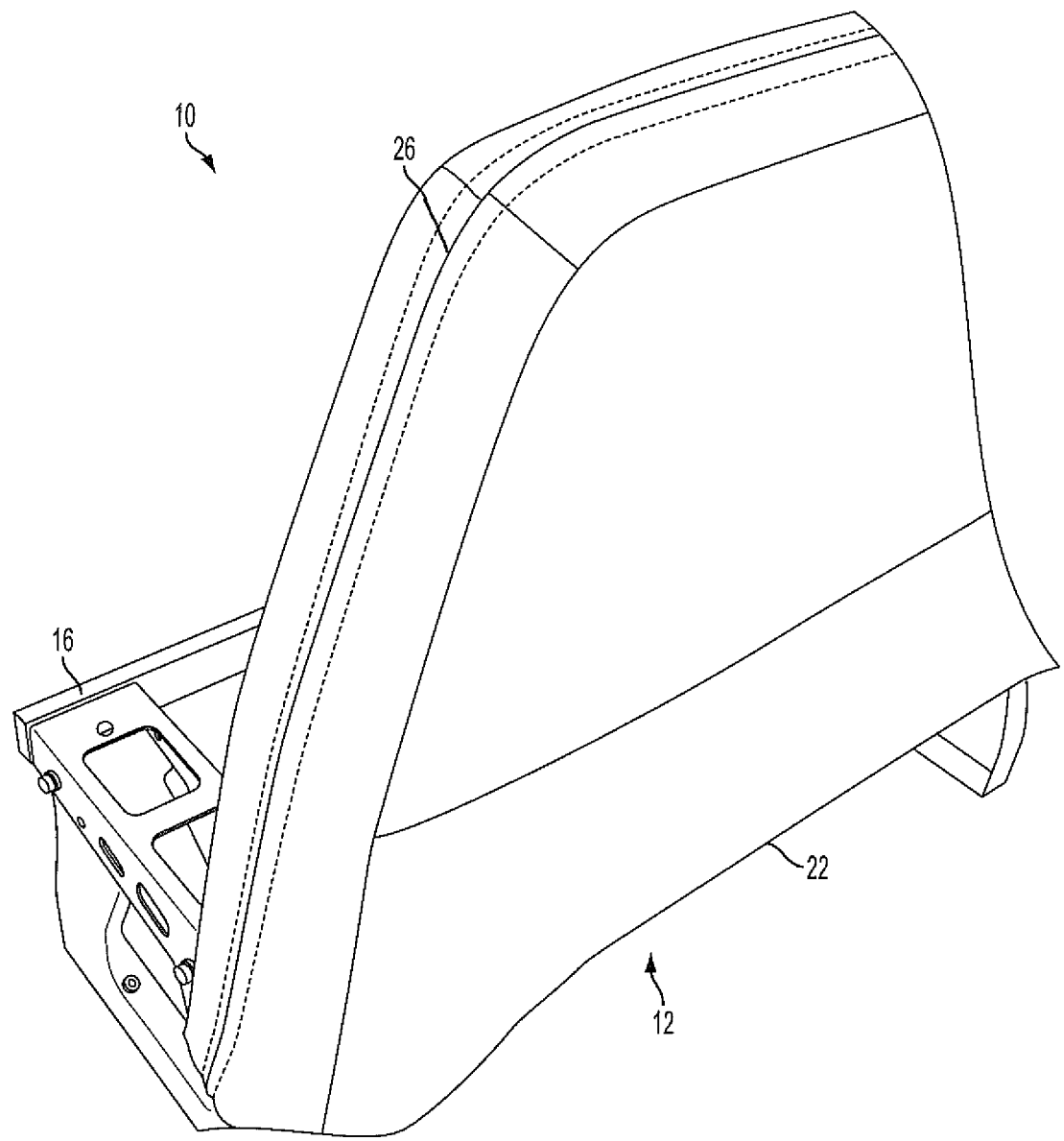
FIG. 3 is a back view of a bus seat back according to the present invention.

Referring to the drawings, a bus seat 10 for use in a bus is disclosed. The bus seat 10 is for use in any known vehicle, such as a commercial bus, school bus, military bus or any other type of vehicle such as aeronautical, maritime or the like. The bus seat 10 is generally covered in a vinyl trim cover material, however any other known fabric, such as cotton, a natural fabric, leather, or any other known covering for a seat may also be used for the bus seat 10 according to the present invention. The bus seat 10 may or may not include seat belts according to the present invention.

The bus seat 10, as shown in the Figures, generally includes a bus seat back member 12 and a bus seat cushion member 14. The bus seat back member 12 and the bus seat cushion member 14 are arranged and secured over a frame 16. The frame 16 is generally made of a metal material, however any other known material such as a ceramic, composite, plastic, or natural material may also be used for the bus seat frame 16. The bus seat frame 16 may have a sub frame 18 connected thereto, wherein the sub frame 18 is made of any known material such as a plastic, a wood, any known natural material, a metal, a ceramic, composite, or any other material. In one embodiment, the bus seat back 12 and bus seat cushion 14 generally have a sub frame 18 connected to the frame 16 of the bus seat 10 for the back portion and the cushion portion of the bus seat 10. The bus seat 10 also may include a foam member 20 which is secured to a surface of the frame 16 or sub frame 18 in both the back and cushion portion 12, 14 of the bus seat 10. It should be noted that in the embodiment shown foam is used, however any other known material that has the attributes of foam to create a comfortable bus seat may also be used according to the present invention. After the foam member 20 is secured to the sub frame 18 or frame 16 via any known fastening technique, such as but not limited to any known mechanical fastening technique or chemical fastening technique, a trim cover 22, 24 may be arranged over the foam 20 for the bus seat back 12 and bus seat cushion 14. It should be noted that in one contemplated embodiment the foam 20 may be precompressed to a predetermined compression and then have the trim cover 22, 24 arranged thereover to keep a firm but stable seating surface for the rider of the bus seat 10. The bus seat back trim cover 22 is affixed over the frame 16 and cushion 20 and any sub framing of the bus seat back 12 and secured thereon.

The bus seat back trim cover 22 of the present invention includes a zipper 26 arranged around the entire outer periphery of the bus seat back 12. The zipper 26 may allow for easy removal and installation of the bus seat back trim cover 22 within the bus environment. Therefore, the bus seat back trim cover 22 is a two piece trim cover 22 having a front portion and a back portion for the bus seat back 12. The method of using a two piece trim cover 22 is for belted seats or non belted seats and greatly improves the installation and removal of the bus seat back trim cover 22 via the zipper 26 connecting the front and back pieces of the seat back trim cover 22. It should be noted that in one contemplated embodiment seat belt support members 28 may be arranged into the front surface of the seat back 12. The seat belt support members 28 create exit points in the front face of the seat back 12 which may increase the support for the front face reinforcements that are tailored to the trim cover and arranged within the frame 16 and sub framing 18 of the seat back 12. These parts that are manufactured into the frame 16 or sub frame 18 of the seat back portion 12 do not require extra molded parts to be provided into the seat back 12 to create seat belt entry and exit points thus reducing costs for the bus manufacturers. It should further be noted that the use of the zippered two piece removably seat back trim cover 22 may also yield savings over conventional methods because of the amount of vinyl or other material used to make the trim cover 22. In one contemplated embodiment, at least a five percent cost savings may occur on the material used because of the zippered seat back trim cover 22. It should also be noted that the use of the two piece zippered seat back trim cover 22 increases customer serviceability because the back surface of the seat 10, that generally sees the most damage from the occupants of the bus, may be replaced by simply unzipping the trim cover back piece 22 and replacing the back piece with a new back piece zipped onto the front piece which may or may not need to be replaced. This may reduce the service cycle time for maintaining and replacing the seat back trim covers 12 to approximately less than eight minutes in some contemplated embodiments. The present invention also includes a methodology and apparatus for securing the zipper 26 to the front and back piece of the two piece seat back trim cover 22, which will be described hereafter.

Figure 4:
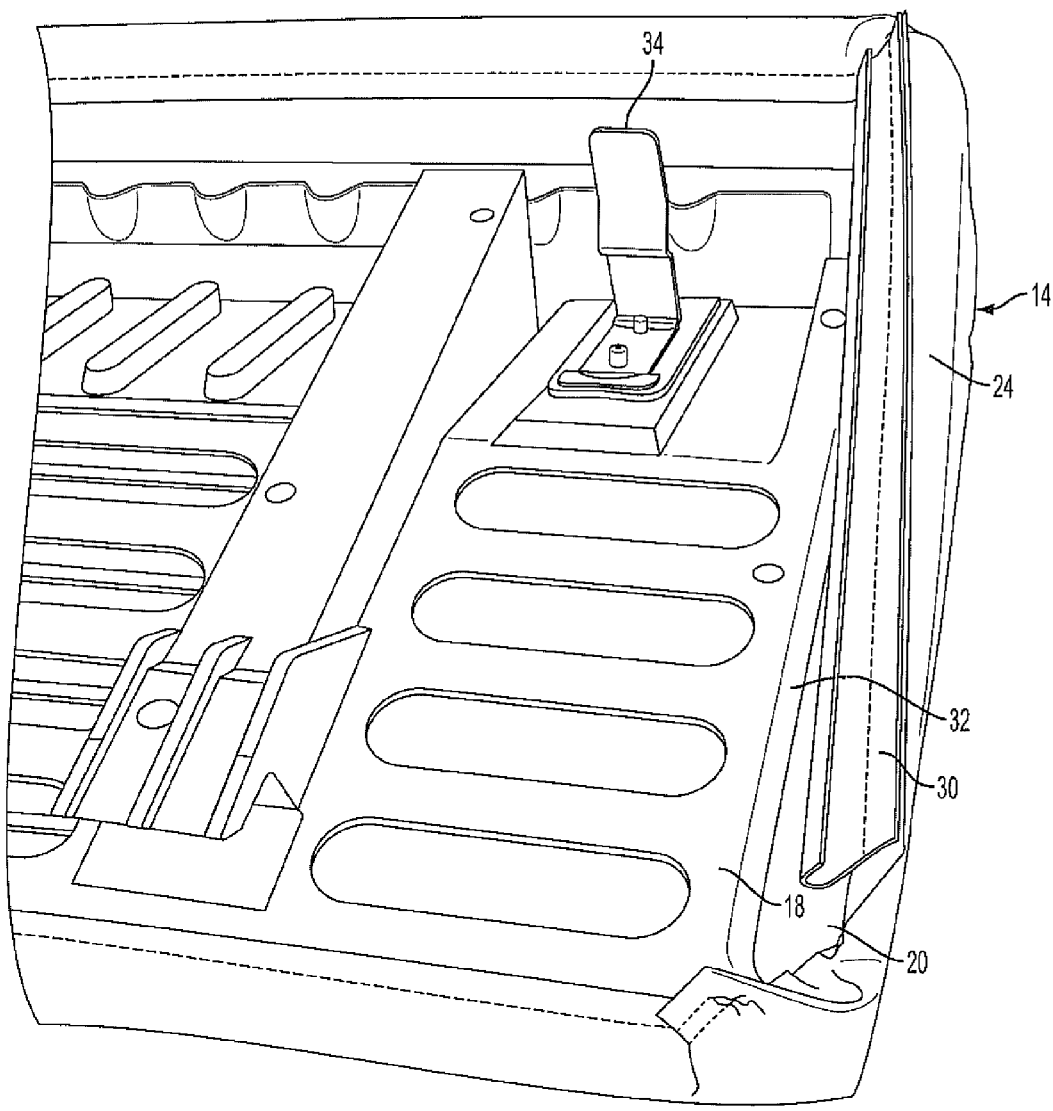
FIG. 4 is a bottom view of a bus seat cushion according to the present invention.
Figure 5:
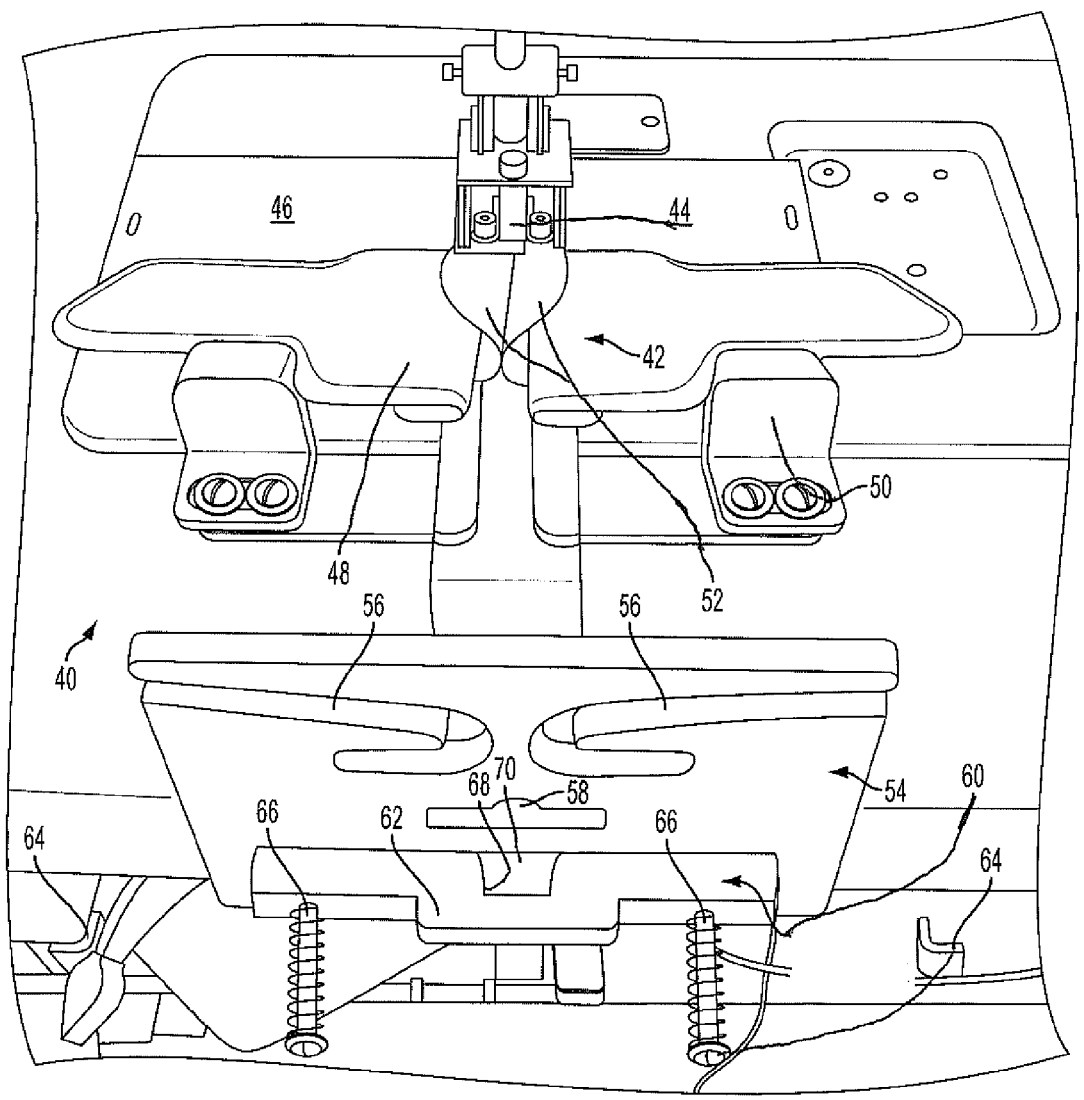
FIG. 5 is a perspective view of an apparatus for securing a zipper to a front and back piece or portion of a bus seat back trim cover.

The bus seat cushion 14 uses a bus seat cushion trim cover 24 and arranges it over a foam 20 or other material arranged on the frame 16 or sub frame 18 of the bus seat cushion 14 seat portion. The cushion seat trim cover 24 may be secured over the bus seat cushion foam 20 and other components via a plurality of J-retainer members 30. These J-retainer members 30 generally may have a J-shaped when viewed in cross section. These J-retainer members 30 may have a predetermined length as shown in FIG. 4 or may be a plurality of smaller width J-retainers secured to an outer edge of the seat back trim cover 24. The J-retainers 30 are secured to cover 24 via any known fastening method, such as any known mechanical or chemical fastening technique. In one contemplated embodiment, the J-retainers 30 are sewn via any known thread to the outer peripheral edge of the seat cushion trim cover 24. It should be noted that any other known fastening technique may also be used. The J-retainer members 30 may then be interengaged with and secured to a securing bracket 32 either secured to a sub frame 18 or framing 16 of the bus seat cushion portion 14. In one contemplated embodiment, an L-bracket 32 is arranged around the entire outer periphery at or near the outer edge of the bus seat cushion portion 14. It should also be noted that in one contemplated embodiment, the L-bracket 32 or any other shaped bracket may be applied to the sub frame 18 such as that shown in FIG. 4. The sub frame 18 as shown in FIG. 4 may also include at least one connector 34 that interacts and interengages with the frame 16 of the bus seat 10 to secure the bus seat cushion 14 in proper alignment with the bus seat back 12 when the bus seat 10 is completely assembled. The L-bracket 32 as shown in the Figures may interact with the J-retainer 30 of the bus seat cushion trim cover 24 and secure the bus seat cushion trim cover 24 to the bottom bus seat cushion portion 14 of the bus seat 10. The J-retainer 30 may interact or interengage with the L-bracket 32 to create a secure connection therebetween thus presenting a taught and neat appearance for the outer surface of the bus seat cushion trim cover 24. The J-retainers 30 generally are arranged around the outer periphery of the bus seat cushion trim cover 24 and present an aesthetically pleasing look to the bus seat cushion 14 and bus seat overall. It should be noted that in one contemplated embodiment the J-retainer 30 and L-bracket 32 are made of a plastic material, however any other known material such as metal, composite, ceramic, or natural material may also be used for the J-retainer 30 and L-bracket 32 or other shaped brackets of the present invention. It should further be noted that any other known retainer 30 may also be used as long as it interacts with the connecting bracket 32 arranged on the sub frame 18 or frame 16 of the bus seat cushion bottom portion 14. The use of the J-retainer 30 with the bus seat cushion portion 14 of the bus seat 10 may realize significant repeatability gains for the manufacturer. This may allow the assembler to connect the cover 24 without the need to control the start and stop position of the J-retainers 30 because they are generally affixed or secured to the L-bracket 32 that encompasses the seat frame 16 or sub frame 18 of the bus seat 10 as described above. It should further be noted that serviceability is greatly improved with the J-retainer 30 connected to the L-bracket 32 because of a reduction of service time to approximately three minutes to replace the bottom cushion seat trim cover 24. It should further be noted that material savings also apply for the cushion seat trim cover 24, such as that for the back seat cover as described above, of approximately ten percent less material being needed with the use of J-retainers 30 and L-bracket 32 system.

As described above, the two piece removable zippered seat back trim cover 22 is made with the use of an apparatus 40 that allows for the zipper 26 to be attached to both the front and back piece or portion of the bus seat trim cover 22 with reduced time and cost. One prior art method of creating or securing a zipper to a piece of material was to have each zipper hand marked at a plurality of locations, i.e., thirty to fifty five locations, on each side of the material, such that the zipper may be properly aligned to the zipper facing. Then each side of the zipper was tacked to the zipper facing, which would ensure each notch mark was aligned to the notches in the facing. Next, each side of the zipper facing was then carefully folded to the outside edge of the zipper and sewn down creating a fold hem on the facing. This process for creating a zipper arranged between two pieces of material had each zipper being sewn four times. Furthermore, it is also very difficult to align the zipper facing with the edge of the zipper teeth. Also, because of the strength characteristics of zippers, it generally is very hard to mark each of the zippers in the exact same location, which results in mismatched corners when swapping different pieces of material having the zippers. The present invention creates a two piece removable zippered bus seat back trim cover 22 via the use of a new sewing machine apparatus 40. The sewing machine apparatus 40 generally includes a zipper folder 42 arranged adjacent to or generally near the needle 44 of a sewing machine 46. It should be noted that any known sewing machine 46 may be used to create the two piece removable seat back trim cover 22 according to the present invention. In one contemplated embodiment, a double needle sewing machine may be used. However, it is also contemplated to use a single needle machine or a multi-needle machine to create the zipper cover 22 depending on the design requirements. The zipper folder 42 generally may have a body 48 which is secured to a plate 50 which is arranged on the sewing machine 46. It should also be noted that the zipper folder 42 may be secured directly to an upper surface of the sewing machine 46. The zipper folder 42 generally may have a first and second curved surface or flange 52 that are arranged back to back with one another and which may allow for the zipper in either the front or back portion of the seat back trim cover 22 to be passed therethrough and sewn by one of the two needles in the double needle sewing machine 46. The curved flanges 52 of the zipper folder 42 may have a predetermined arc or curve depending on the design requirements of the bus seat back trim cover 22. It should be noted that generally the zipper folder 42 is made of a metal material, however any other plastic, composite, ceramic, or natural material may also be used for the zipper folder 42.

The sewing machine apparatus 40 also includes a pre-folder 54 arranged a predetermined distance from the needles 44 of the sewing machine 46 and the zipper folder 42. The pre-folder member 54 generally has a rectangular shape and includes a first and second channel 56 arranged therein. The first and second channels 56 are arranged a predetermined distance apart from one another and generally have a J-shaped when viewed from a front thereof. The curve of the J-shaped channels 56 generally may coincide with the curves of the flanges 52 of the zipper folder member 42. The J-channels 56 generally may be arranged near a top end of the pre-folder member 54. It should be noted that any other shape may be used for the pre folder 54 or channels 56 other than those shown in the figures. The pre-folder member 54 also may include a generally rectangular orifice 58 arranged below the J-shaped channels 56 of the pre-folder member 54. This rectangular orifice 58 passes through the width of the pre-folder member 54 and is used to pass the zipper 26 through, after leaving a zipper tensioner 60, to the sewing machine 46. It should be noted that it is contemplated to use any other shaped orifice below the J-shaped channels in the pre-folder member 54.

The sewing machine apparatus 40 also includes a zipper tensioner 60 which is arranged on a front face of the pre-folder member 54. The zipper tensioner 60 generally is arranged on the front face of the pre-folder member 54 below the orifice 58 of the pre-folder member 54. The zipper tensioner member 60 when viewed from a side, generally has a rectangular shape with a predetermined size flange 62 extending therefrom, which gives the zipper tensioner 60 a generally U-shape. The zipper tensioner 60 also may include a plurality of orifices therethrough, through which a fastener 64 is arranged. In one contemplated embodiment, the fastener 64 is a screw or the like which has a spring 66 arranged thereover such that the spring 66 is arranged between an outer surface of the zipper tensioner 60 and the head of the fastener 64. The spring 66 allows for the zipper tensioner 60 to be secured to the pre-folder member 54 at a predetermined tension or with a predetermined force applied between the zipper tensioner 60 and the pre-folder member 54. By turning the fastener 64 it may increase and/or decrease the force being applied by the spring 66 thus increasing or decreasing the force between the pre-folder member 54 and the zipper tensioner 60. The zipper tensioner 60 also may include a predetermined shaped cutout or notch 68 arranged generally at a mid point thereof. This cutout or notch 68 generally is aligned with the mid point of the pre-folder member 54. The notch 68 may pass the zipper 26 therethrough the orifice 58 of the pre-folder member 54 and up to the zipper folder 42 and finally the needles such that the zipper 26 may be sewn to the front and back portions of the seat back trim cover 22 according to the present invention. It should be noted that in one contemplated embodiment a predetermined sized tensioning plug 70 is arranged within the notch 68 of the zipper tensioner 60 and may create the necessary tension on the zipper 26 as it passes through the pre-folder member 54 and zipper folder 42 of the sewing machine apparatus 40 according to the present invention. The plug 70 generally may be made of any known material such as a rubber, plastic, natural material, metal, composite, ceramic or any other known material. The zipper tensioner 60 may allow for the zipper 26 to be passed through at a predetermined tension thus having the same tension being applied to the zipper 26 prior to its attachment to either the front or back portion of the seat back trim cover 22. It should be noted that generally the pre-folder member 54 and zipper tensioner 60 are generally made of a metal material, however any other known metal, ceramic, composite, natural material, plastic, or the like may be used to create the pre-folder member 54 and the zipper tensioner 60 according to the present invention. The pre folder member 54 and zipper tensioner 60 may be secured to the zipper folder 42 by a connector member, to a surface of the sewing machine 46, or any other component or surface.

In operation, the methodology for connecting the zipper 26 to the two piece removable seat back trim cover 22 is as follows. The pre-folder member 54 and zipper tensioner 60 are attached to a surface or component on which the sewing machine 46 is arranged or to the sewing machine itself. After the pre-folder member 54 and zipper tensioner 60 are arranged at a predetermined position and placed with relation to the sewing machine 46, each portion of the zipper 26 is hand marked in one location which may be used as a start point for the sewing operation. Next in the methodology, the zipper 26 and both the front and back trim cover portions 22 and/or faces may be fed through the zipper tensioner 60 and the pre-folder member 54. This may pre-fold the front and back portions of the seat back trim cover 22 and put the appropriate tension on the zipper 26 with relation to the front and back portions of the seat back trim cover 22. Next in the methodology, the front and back trim cover 22 portions along with the pretensioned zipper 26 may be passed through the zipper folder 42. Then both sides of the zipper 26 and the seat back trim front and back portions 22 may be sewn simultaneously by the double needled sewing machine 46. The result of using this methodology as described above is that each zipper 26 are sewn to the front and back portions, respectively, of the seat back trim cover 22 with the same amount of tension which ensures that the corners align when the back or front cover 22 alone are replaced on a bus seat back 12 or if two new pieces are replaced on the bus seat back 12. Furthermore, each zipper 26 may be processed, i.e., folded and hemmed with only one sew rather than the four sews that was used on previous prior art processes to connect the two materials with a zipper therebetween. Furthermore, it should be noted that the folds and hems are very consistent with no variation as both the pre-folder 54 and zipper folder 42 are used to ensure such uniformity. It should further be noted that the start and stop location for the zipper 26 of the seat back trim cover 22 is generally arranged a predetermined distance from the end of the zipper 26 thus eliminating any stretch issues from effecting the zipper 26 and operation of the zipper 26 during installation of the seat back trim cover 22. In one contemplated embodiment, the start/stop location may be arranged approximately 115 millimeters from each end of the zipper 26. It should be noted that any other location may also be used ranging anywhere from one millimeter to hundreds of centimeters from the end of the bus seat back trim cover portions 22. It should be noted that any known zipper 26 may be used with the present invention, such as any known metal, plastic, composite, natural material zipper or the like.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A zipper folding and tensioning apparatus for use with a sewing machine, said apparatus comprising:
    a zipper folder arranged adjacent to a needle of the sewing machine;
    a pre-folder member aligned with said zipper folder and arranged a predetermined distance from said zipper folder;
    a zipper tensioner secured to and engaged with a front face of said pre-folder member; and
    at least one fastener arranged between said zipper tensioner and said pre-folder member.

2. The apparatus of claim 1 wherein said pre-folder member having generally a "J" shaped channel arranged therein.

3. The apparatus of claim 2 wherein said pre-folder member having a generally second "J" shaped channel arranged therein.

4. The apparatus of claim 3 wherein said pre-folder member having an orifice for a zipper to pass therethrough, said pre-folder member having a generally rectangular shape.

5. The apparatus of claim 1 wherein said zipper tensioner having a notch arranged near a midpoint thereof.

6. The apparatus of claim 4 wherein said orifice is arranged below said first and second "J" shaped channels and passes through a width of said pre-folder member.

7. The apparatus of claim 1 wherein said fastener having a spring arranged thereover, said spring applies a force between said zipper tensioner and said pre-holder member.

8. The apparatus of claim 5 wherein said notch having a plug arranged therein.

9. The apparatus of claim 1 wherein the sewing machine is a double needle machine.

10. A method of securing a zipper to a bus seat cover, said method comprising the steps of:
    marking each zipper at one location;
    feeding the zipper through a tensioner;
    feeding the zipper and a first and second cover material through a pre-folder member, said tensioner secured to a front face of said pre-folder member;
    feeding the zipper and said first and second cover material through a zipper folder; and
    sewing the zipper to both cover materials simultaneously.

11. The method of claim 10 wherein said one location is a start point.

12. The method of claim 11 wherein said start point is approximately 115 mm from an end of the zipper.

13. The method of claim 10 wherein said sewing step ensures the zipper is sewn with a similar amount of tension to each cover material.

* * * * *